No. 724,185. PATENTED MAR. 31, 1903.
G. W. H. HUGHES.
CLAMPING COLLAR FOR USE IN CUTTING HOLES IN STOVEPIPES.
APPLICATION FILED DEC. 23, 1902.
NO MODEL.
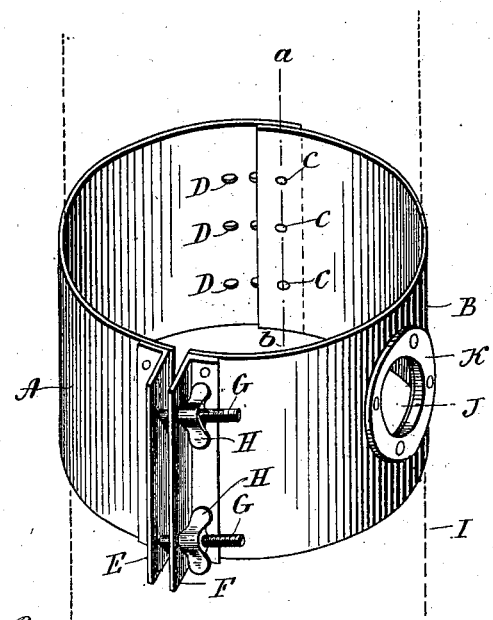
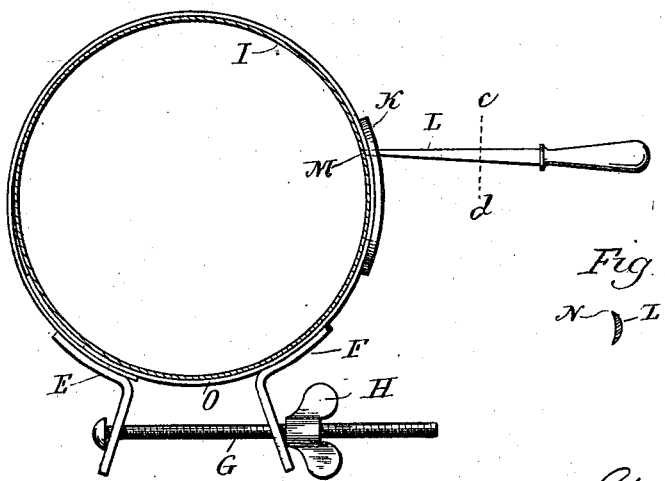
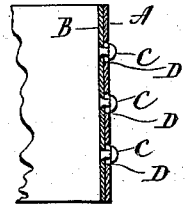

UNITED STATES PATENT OFFICE.

GEORGE W. H. HUGHES, OF NEW HAVEN, CONNECTICUT.

CLAMPING-COLLAR FOR USE IN CUTTING HOLES IN STOVEPIPES.

SPECIFICATION forming part of Letters Patent No. 724,185, dated March 31, 1903.

Application filed December 23, 1902. Serial No. 136,368. (No model.)

*To all whom it may concern:*

Be it known that I, GEORGE W. H. HUGHES, of New Haven, in the county of New Haven and State of Connecticut, have invented a new and useful Improvement in Clamping-Collars for Use in Cutting Holes in Stovepipes; and I do hereby declare the following, when taken in connection with the accompanying drawings and the letters of reference marked thereon, to be a full, clear, and exact description of the same, and which said drawings constitute part of this specification, and represent, in—

Figure 1, a perspective view of a collar constructed in accordance with my invention and represented as upon a stovepipe, which is shown in broken lines; Fig. 2, a sectional view on the line $a\,b$ of Fig. 1; Fig. 3, a top or plan view of a modified form of clamping-collar with the cutting-tool in position preparatory to cutting; Fig. 4, a transverse sectional view of the cutter on the line $c\,d$ of Fig. 3.

This invention relates to an improvement in clamping-collars for use in cutting holes in stovepipes—that is, comparatively small holes in which pipes may extend from the covers of cooking vessels and so that odors from the vessels may be conducted to the chimney.

Sheet iron from which stovepipes are formed is very thin and difficulty is experienced in cutting a circular hole.

The object of this invention is to provide a band or collar adapted to be clamped around the pipe and so as to reinforce it and permit a hole to be readily cut therein; and the invention consists in the construction, as hereinafter described, and particularly recited in the claim.

Preferably, and as shown in Fig. 1 of the drawings, I employ two strips A B of comparatively thin sheet metal and provide one member B with studs C and the other member A with eyelets or holes D, by which the ends of the strips may be adjustably connected together. At the opposite ends the strips are provided with outwardly-projecting flanges E F, through which bolts G extend, on which bolts thumb-nuts H are arranged, by which the ends of the sections may be drawn together and clamped about a stovepipe I. In one or both members I form a round hole J, corresponding in diameter to the diameter of the hole to be cut in the stovepipe, and around this opening I secure a washer K, which forms a thick wall around the opening. This collar is clamped tightly around a stovepipe, with the opening J over the point where it is desired to form a hole, the studs C and holes D permitting the device to be adjusted for varying sizes of stovepipes, which are usually four, five, or six inches in diameter. When the collar is clamped in position, a hole may be readily cut in the pipe through the hole J with a tool L, which is formed with a sharp point M which readily punctures the stovepipe, and with a cutting edge N, which will follow the wall formed by the openings in the collar and the washer, the washer giving sufficient bearing-surface for the tool to ride upon.

Instead of dividing the collar and connecting the ends with studs and holes, as described, it may be formed from a single strip, as shown in Fig. 3, in which case the flange or bracket E may be secured to one end of the strip, while the flange or bracket F may be secured to the face of the strip, so as to form a projecting end O, which will be overlapped by the end carrying the bracket E, and the strip thus formed will be drawn together with screws, as before described.

Having fully described my invention, what I claim as new, and desire to secure by Letters Patent, is—

A clamping-collar for use in cutting holes in stovepipes, comprising a sheet-metal collar adapted to be clamped about a stovepipe, a hole in said collar, and a thick metal washer secured to said collar, the opening in the washer corresponding to the hole in the collar, the edge of which it reinforces, substantially as described.

In testimony whereof I have signed this specification in the presence of two subscribing witnesses.

GEORGE W. H. HUGHES.

Witnesses:
FREDERIC C. EARLE,
CLARA L. WEED.